(12) United States Patent
Yamamoto (10) Patent No.: US 10,789,517 B2
(45) Date of Patent: Sep. 29, 2020

(54) INFORMATION PROCESSING DEVICE THAT GENERATES DATA TO PRINT COLOR CHART, INFORMATION PROCESSING METHOD FOR GENERATING DATA TO PRINT COLOR CHART, AND COLOR CHART

(71) Applicant: SEIKO EPSON CORPORATION, Tokyo (JP)

(72) Inventor: Takayuki Yamamoto, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/183,802

(22) Filed: Nov. 8, 2018

(65) Prior Publication Data
US 2019/0147308 A1   May 16, 2019

(30) Foreign Application Priority Data
Nov. 10, 2017   (JP) ................................ 2017-217046

(51) Int. Cl.
*G06K 15/02* (2006.01)
*H04N 1/60* (2006.01)

(52) U.S. Cl.
CPC ....... *G06K 15/1878* (2013.01); *G06K 15/027* (2013.01); *H04N 1/6033* (2013.01); *H04N 1/6036* (2013.01); *H04N 1/6097* (2013.01)

(58) Field of Classification Search
CPC ............. G06K 15/1878; G06K 15/027; H04N 1/6033; H04N 1/6036; H04N 1/6097
See application file for complete search history.

(56) References Cited

U.S. PATENT DOCUMENTS 6,972,867 B1 * 12/2005 Venable ............... H04N 1/6033
358/1.9
9,992,380 B2   6/2018 Shibata
(Continued)

FOREIGN PATENT DOCUMENTS

| CN | 106470290 A | 3/2017 |
|---|---|---|
| EP | 1206122 A1 | 5/2002 |
| JP | 2002-234213 A | 8/2002 |

OTHER PUBLICATIONS

The Extended European Search Report for the corresponding European Patent Application No. 18205354.6 dated Mar. 14, 2019.

*Primary Examiner* — Christopher Wait
(74) *Attorney, Agent, or Firm* — Global IP Counselors, LLP (57) ABSTRACT

Provided is technology enabling identifying the page of a color chart being measured while measuring the colors of the color chart, and generating color correction data. An information processing device 100 has a generator 121 that generates image data for printing a color chart 200 including, in part of the multiple patches, patches of an identification patch group 210 that represents page information by the sequence of patches in the group, the page information being at least one of the page number and order of pages in the color chart 200; an extractor 125 that extracts, from the color measurement results of the color chart 200 printed based on the image data, the page information represented by the patch sequence of the identification patch group 210 in the color chart 200; and an adjuster 127 that generates color correction data based on the color measurement results of the color chart 200.

12 Claims, 7 Drawing Sheets

(56) References Cited

U.S. PATENT DOCUMENTS

| | | | |
|---|---|---|---|
| 2006/0028699 A1* | 2/2006 | Venable | H04N 1/6033 358/504 |
| 2008/0204773 A1* | 8/2008 | Morgana | H04N 1/6033 358/1.9 |
| 2012/0154478 A1 | 6/2012 | Maeda | |
| 2017/0054877 A1 | 2/2017 | Shibata | |

* cited by examiner

INFORMATION PROCESSING DEVICE THAT GENERATES DATA TO PRINT COLOR CHART, INFORMATION PROCESSING METHOD FOR GENERATING DATA TO PRINT COLOR CHART, AND COLOR CHART

BACKGROUND

1. Technical Field

The present invention relates to an information processing device, information processing method, program, and color chart.

2. Related Art

One common method of improving the color reproducibility of a printer is to use a color chart to adjust the output of the printer. In this method, a color chart is printed by the printer, and the colors in the printed color chart are then measured with a colorimeter. Based on the correlation between the color values measured by the colorimeter and the print data for the color chart, color correction data for adjusting the color output of the printer is generated.

The color calibration job identification system disclosed in JP-A-2002-234213 (U.S. Pat. No. 6,972,867) prints a patch code containing job identification data including a page number on a printed page on which a color target is printed.

The number of colors that is measured must be increased to produce precise color correction data. This increases the number of color chart pages. When measuring a color chart with many pages, the user may accidentally measure the wrong page. If the wrong page is measured, color measurement must be restarted from the beginning. A method of confirming the page of the color chart being measured while measuring the colors in the color chart to produce color correction data is therefore needed. This need is not addressed by JP-A-2002-234213 (U.S. Pat. No. 6,972,867).

SUMMARY

An object of the present invention is to provide technology enabling confirming the page of the color chart being measured while measuring the colors in the color chart to produce color correction data.

To achieve the foregoing object, an aspect of the invention includes a generator that generates data for printing used to print a color chart of multiple pages, the color chart having multiple patches include identification patches expressing page information of the color chart by the sequence of the patches, and profile production patches; a communication interface that receives the color measurement results of the color chart printed based on the data for printing; an extractor that extracts, from the color measurement results the communication interface receives, the page information represented by the order of the identification patches in the color chart; and an adjustor that generates color correction data based on the color measurement results received by the communication interface.

This aspect of the invention extracts page information for a color chart from the color measurement results of a color chart used to generate color correction data. As a result, the page of the color chart being measured can be recognized while measuring the colors in the color chart, and color correction data can be generated.

In another aspect of the invention, the generator generates the data for printing used to print the color chart with the identification patches on the first line of a color chart having the patches arrayed in a line and column grid.

This configuration can generate a color chart having identification patches on the first line of the color chart. As a result, page information of the color chart can be acquired before generating color correction data based on the results of measuring the color of multiple patches. As a result, when the page being measured is the wrong page, processing can be stopped before generating color correction data.

In another aspect of the invention, the generator disposes in the identification patches one or more patches of each of the colors white, cyan, magenta, yellow, blue, red, green, and black.

This configuration enables easily identifying the identification patches in a color chart comprising an array multiple patches based on the color measurement results.

In another aspect of the invention, the generator determines the order of the identification patches so that identification patches of the same color are not adjacent to each other on the same line.

This configuration simplifies identifying the identification patches based on the color measurement results.

Another aspect of the invention also has a notifier configured to report when the page information extracted by the extractor differs from page information of a specific sequence.

This configuration enables reporting when the extracted page information differs from the expected page information. The user can therefore be informed when the pages of the color chart are measured in the wrong order.

In another aspect of the invention, the generator generates the data for printing for a color chart having multiple pages, the identification patches of each page including multiple identification patches representing at least one of a page number or a sequence of pages in the color chart.

This configuration enables identifying each page of a color chart comprising multiple pages based on the results of measuring the colors of the identification patches.

In another aspect of the invention, the adjustor, based on the page information extracted by the extractor, identifies a page of the color chart corresponding to the color measurement results received by the communication interface.

This configuration enables extracting page information expressed by the order of the identification patches and identifying the page of the color chart.

In another aspect of the invention, the adjustor sorts the color measurement results received by the communication interface according to a sequence of pages of the identified color chart, and generates the color correction data.

This configuration sorts the color measurement results according to the order of the pages in the identified color chart. As a result, even if the color measurement results are not input to the information processing device in the order of the pages of the color chart, the color measurement results of multiple patches can be arranged in the order of the pages of the color chart.

In another aspect of the invention, the communication interface receives a color measurement results of the color chart a printer printed based on the data for printing; and the adjustor generates color correction data appropriate to the printer based on the color measurement results the communication interface receives.

This configuration enables generating color correction data appropriate to the printer that printed the color chart.

Another aspect of the invention is a information processing method including: generating data for printing used to print a color chart of multiple pages each including identification patches representing page information by a sequence of patches, and profile production patches; measuring the color chart printed based on the data for printing, and storing color measurement results acquired by color measurement; extracting from the color measurement results page information represented by a sequence of identification patches in the color chart; and generating color correction data based on the color measurement results.

This aspect of the invention extracts page information for a color chart from the color measurement results of a color chart used to generate color correction data. As a result, the page of the color chart being measured can be recognized while measuring the colors in the color chart, and color correction data can be generated . . . .

Another aspect of the invention is a color chart printed by a printer and including: identification patches representing page information of the color chart by a sequence of patches, and profile production patches, arrayed in a line and column grid; the identification patches being a sequence of patches of multiple different colors.

This configuration enables generating color correction data and extracting page information of a color chart by measuring the colors in the color chart.

In another aspect of the invention, the identification patches include one or more patches of each of the colors white, cyan, magenta, yellow, blue, red, green, and black.

This configuration enables appropriately extracting the page information of a color chart by color measurement of a color chart printed with colors separated a sufficient distance in a CMYK color space.

Other objects and attainments together with a fuller understanding of the invention will become apparent and appreciated by referring to the following description and claims taken in conjunction with the accompanying drawings.

DESCRIPTION OF EMBODIMENTS

Figure 1:
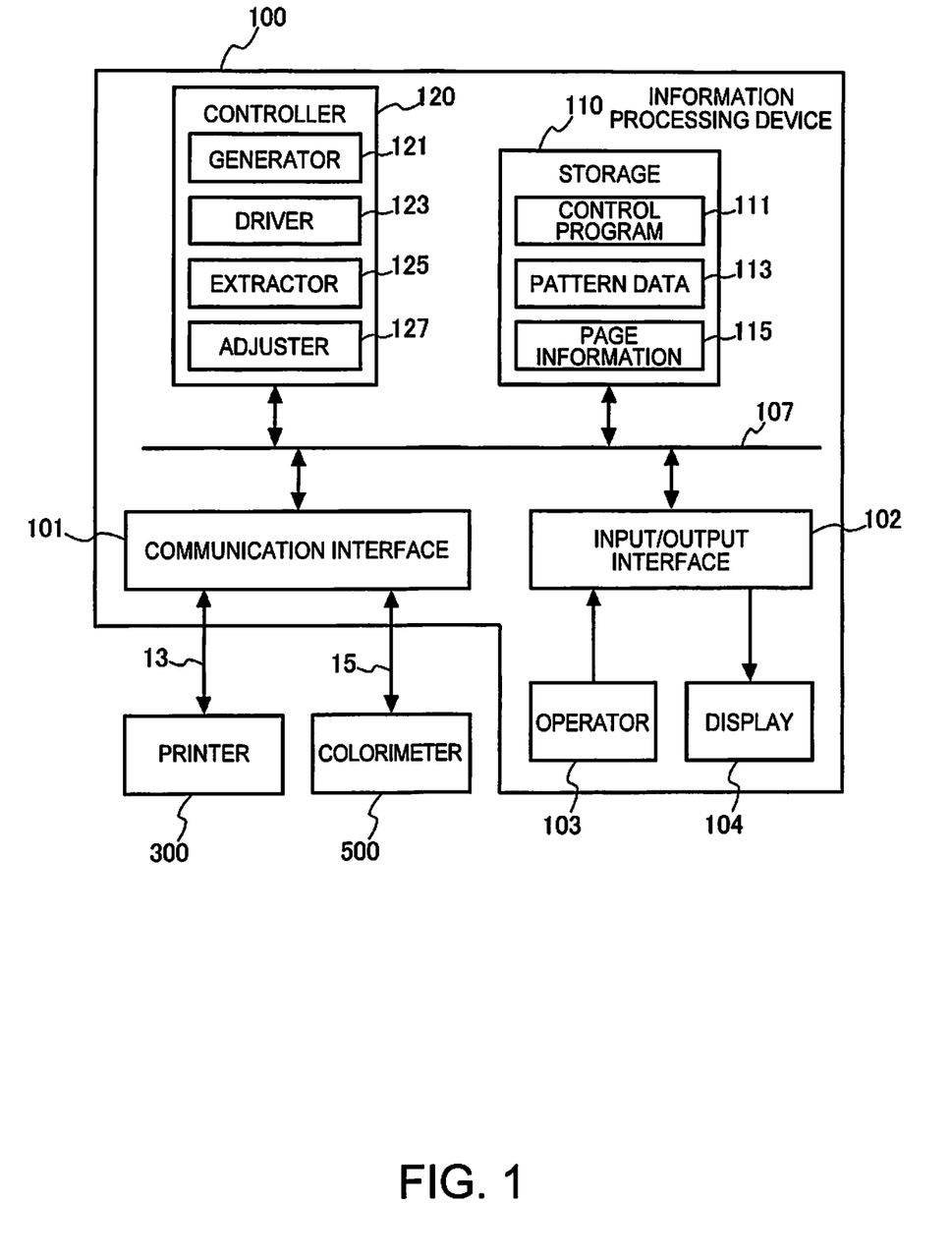
FIG. 1 is a block diagram of a system including an information processing device.

A preferred embodiment of the present invention is described below. FIG. 1 is a because illustrating the configuration of a system including an information processing device 100 according to the invention.

The configuration of a system according to the invention includes an information processing device 100 such as a personal computer, a printer 300, and a colorimeter 500.

The information processing device 100 includes a communication interface 101, an input/output interface 102, an operator 103, a display 104, storage 110, and a controller 120. The communication interface 101, input/output interface 102, storage 110, and controller 120 are communicatively connected through a bus 107.

The communication interface 101 includes multiple connectors and interface circuits for connecting cables (none shown). The communication interface 101 is connected to the printer 300 through a cable 13, and to the colorimeter 500 through a cable 15. The interfaces of the communication interface 101 include, for example, an Ethernet®, IEEE 1394, USB, or other data communication interfaces. The communication interface 101 operates as a receiver for receiving the color measurements resulting from measuring a color chart 200.

The operator 103 is a keyboard, mouse, or other input device for receiving user operations (commands).

The input/output interface 102 outputs to the controller 120 operation signals corresponding to the operation (command) received by the keyboard, mouse, or other means of the operator 103.

The display 104 is a display device such as an LCE panel for displaying information.

The input/output interface 102 displays information on the display 104 as controlled by the controller 120. The display 104 is an example of a notifier.

The storage 110 comprises magnetic disc devices such as hard disk drives, and semiconductor devices such as SSD (Solid State Drive). The storage 110 may also be configured by EPROM (Erasable Programmable Read Only Memory), EEPROM (Electrically Erasable Programmable Read-Only Memory), flash memory, or other nonvolatile memory devices.

The storage 110 stores a control program 111 including applications such as driver softer run by the controller 120, pattern data 113, and page information 115. The pattern data 113 is used to generate image data for printing a color chart. The page information 115 is data relating page numbers to arrays of colors in multiple patches on the color chart. The color chart, patches, and pattern data 113 are described below.

The controller 120 includes a CPU (Central Processing Unit), ROM (Read Only Memory), RAM (Random Access Memory) and other peripheral circuits (all not shown). The CPU is a processor that executes operations, and executes operations according to a control program stored in ROM or storage 110. ROM is nonvolatile memory, and stores a control program and operating data, for example. RAM is used as working memory for temporarily storing the control program executed by the processor and operating data.

This embodiment describes a configuration in which the controller 120 has one processor (CPU), and the processor executes operations according to a control program, but the processor may be configured with multiple processors or semiconductor chips. For example, the controller 120 may be configured with co-processors such as a SoC (System-on-a-Chip), MCU (Micro Control Unit), or FPGA (Field-Programmable Gate Arrays). In addition, the controller 120 may cause the CPU and co-processor to operate cooperatively, or selectively use one at a time.

Function blocks of the controller 120 include a generator 121, driver 123, extractor 125, and adjuster 127. These function blocks are shown for convenience as blocks providing specific functions by the CPU executing operating processes according to a control program, and do not indicate specific software applications or hardware.

The generator 121 generates image data based on pattern data 113, for example, stored in storage 110. The image data is data for printing an image of a color chart. A color chart is an image of multiple patches of different colors arrayed in a grid. The color chart is described in detail below with reference to FIG. 2. Color information specifying the color of each patch is included in the image data. For example, if the color information is in a R (red) G (green) B (blue) format, the color information is information specifying the gradation of each R, G, B value. If the color information is C (cyan) M (magenta) Y (yellow) K (black) color data, the color information is information specifying the gradation of each C, M, Y, K color value. The generator 121 outputs the generated image data to the driver 123.

The image data generated by the generator 121 is input to the driver 123. The driver 123 is a function block embodied by the controller 120 running a driver program.

The driver 123 converts the input image data to print data in a format that the printer 300 can interpret, and outputs the converted print data to the printer 300. When converting the image data to data for printing, the driver 123 executes a resolution conversion process, color conversion process, rasterizing process, and a process adding commands.

The resolution conversion process is a process of converting the image data to the print resolution. When the image data is RGB data, the color conversion process is a process of converting RGB image data to CMYK. When the image data generated by the generator 121 is CMYK, the driver 123 does not execute the color conversion process.

The rasterizing process is a process of arranging the pixel data of the images in the image data to the sequence in which the dots are formed when printing. The process of adding commands is a process of adding command data corresponding to the printing method to the data output from the rasterizing process. The command data may include data related to the amount of movement and speed in the conveyance direction of the sheet S, for example.

This embodiment describes the driver 123 executing the resolution conversion process, color conversion process, rasterizing process, and a process adding commands, but these processes may be executed by other function blocks. For example, the CPU of the controller 120 may execute a RIP (Raster Image Processor) program that analyzes the image data and renders rater image data. The CPU may also execute the resolution conversion process, color conversion process, rasterizing process, and a process adding commands in the process executed according to the RIP program. These processes may also be executed by dedicated modules installed on the information processing device 100.

The color values of the patches measured by the colorimeter 500 are input to the extractor 125. Based on the input color values, the extractor 125 extracts information expressed by the array of patches in the color chart. More specifically, in this example the extractor 125 extracts at least one of the order of pages in the color chart and the page numbers as the page information.

The color values, which result from measuring the color chart 200 the printer 300 printed based on the print data, are input to the adjuster 127. Based on the input measured color values, the adjuster 127 generates color correction data appropriate to the printer 300. More specifically, the adjuster 127 produces color correction data for adjusting the output of the printer 300 that printed the color chart 200. This can improve the color reproducibility of the printer 300.

The printer 300 in this example is an inkjet printer that ejects four colors of ink, specifically C (cyan), M (magenta), Y (yellow), and K (black). The printer 300 receives data for printing from the information processing device 100, and based on the received print data prints an image on a sheet S. As a result, an image of the color chart is printed in multiple pages on sheets S.

The colorimeter 500 in this example emits light to a patch to measure, receives the light reflected from the patch through a photoelectric conversion element and measures the spectral reflectance of the patch, and calculates the color value of the patch based on the measured spectral reflectance. The colorimeter 500 in this embodiment uses a CIE Standard Illuminant D65 that simulates measuring the printed object under average midday light, and outputs the color values as L*a*b* values in the CIELAB color space. Below, L*a*b* values are abbreviated as Lab values.

The colorimeter 500 outputs the calculated color values to the information processing device 100. The information processing device 100 then stores the measured color values input from the colorimeter 500 in RAM of the controller 120. If an operation selecting the storage 110 as the location to the store the measured color values is received by the operator 103, the information processing device 100 stores the color values to storage 110.

Figure 2:
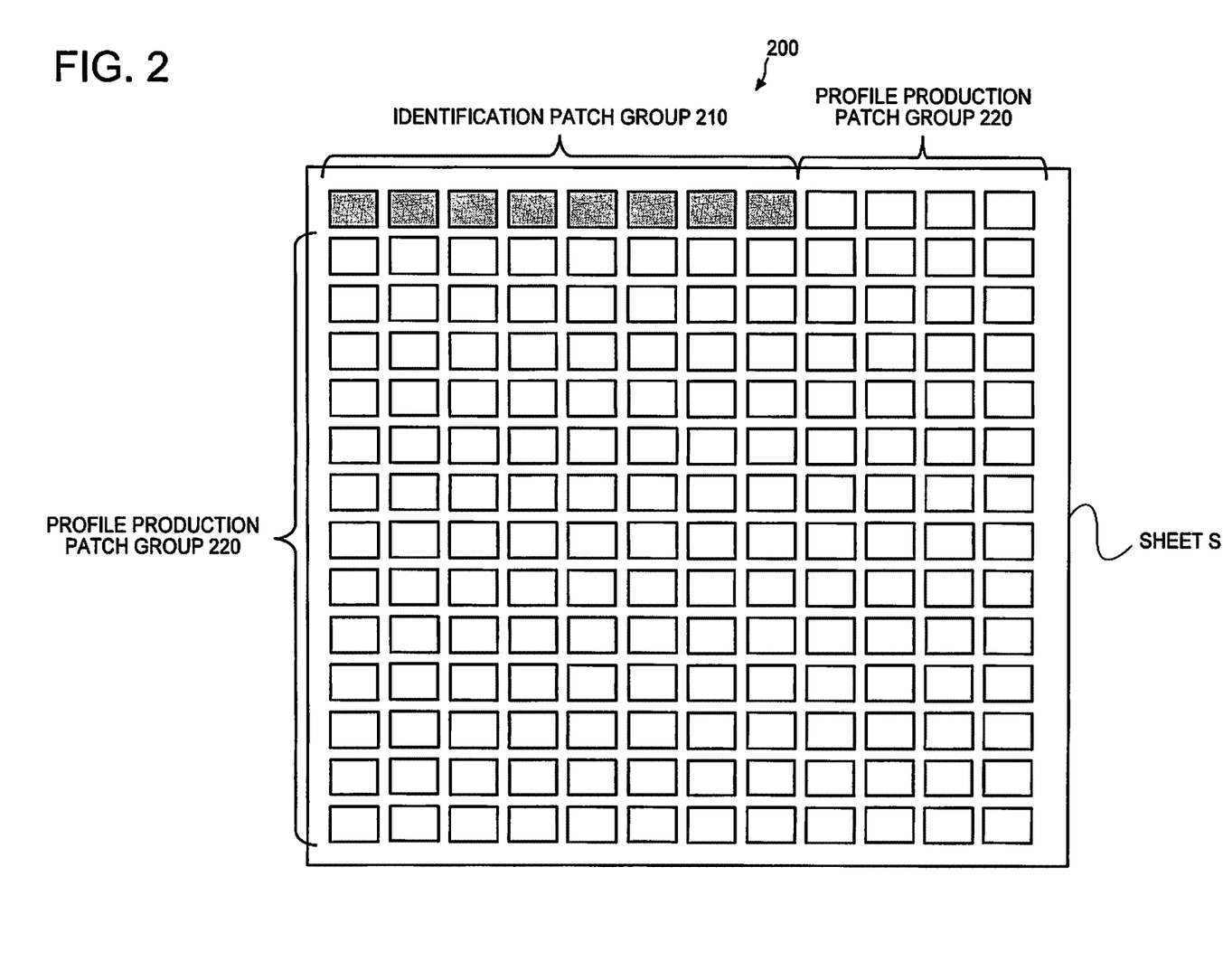
FIG. 2 shows an example of a color chart.

FIG. 2 shows an example of a color chart 200.

The color chart 200 is an image of multiple patches arrayed in an equally spaced grid of horizontal lines and vertical columns on the sheet S. Each patch in this example is rectangular, and the patches are all substantially the same size. Note that while the patches in this example are square, the shape of the patches is not limited to rectangular. The patches formed in the color chart 200 are separated into an identification patch group 210 and a profile production patch group 220.

There are eight patches in the identification patch group 210. In the color chart 200 shown in FIG. 2, the eight shaded patches starting from patch 1 on the left end to patch 8 on the first line form the identification patch group 210. All patches other than the patches of the identification patch group 210 are patches in the profile production patch group 220. Note that the patches in the profile production patch group 220 are all white rectangles in FIG. 2, but in an actual color chart 200, each patch is a different color. The patches in the identification patch group 210 are examples of identification (ID) patches according to the invention.

The patches in the profile production patch group 220 are patches of colors used for correction, and are patches of different gradations of C, M, Y, and K. The patches in the profile production patch group 220 are produced based on predefined pattern data 113 such as defined by ECI (European Color Initiative) 2002. The pattern data 113 is data defined by the number of patches generated as the profile production patch group 220, and the color of each patch (CMYK gradation). The generator 121 reads pattern data 113 from the storage 110, and sets the read pattern data 113 as the color information of the patches in the profile production patch group 220.

Each patch of the identification patch group 210 is a different color, and expresses page information indicating at least one of the sequence of pages in the color chart 200 and the page number is expressed by the order (sequence) of the patches (colors). The order (sequence) of the patches (colors) of the identification patch group 210 is also different on each page of the color chart 200.

In this embodiment of the invention, the identification patch group 210 expresses page information about the printed sheets S, but could express other information. For example, the number of patches in the identification patch group 210 could be greater than eight, and information such as the type of sheet S could be expressed by the additional patches.

In a typical example, the patches of the identification patch group 210 are one of eight colors, white, cyan, magenta, yellow, blue, red, green, and black. The generator 121 determines the order of the patches in the identification patch group 210 so that no two adjacent patches on the same line (the first line in this example) are the same color.

A configuration in which multiple patches of the same color are not included in the patches of any identification patch group 210 printed on the same page of a sheet S. For example, the patches that are printed on the same page of a sheet S and are in an identification patch group 210 will not include multiple white patches. More specifically, the eight patches of the identification patch group 210 are set (arranged) so that there is no duplication of the above eight colors.

In this example, the patches of the identification patch group 210 can express 8!=40320 different values. For example, if the patches of the identification patch group 210 represent page numbers, then page numbers from 1 to 40320 can be expressed. This number (40320) corresponds to a 16 digit binary number. More specifically, an arrangement of patches of eight colors can store 15 bits of binary data.

This is described using an example of the generator 121 producing an array of x patches where x is an integer 15-bits long.

For integer x, the generator 121 selects $y_0, y_1, \ldots y_7$ according to equation (1) below, where $y_0, y_1, \ldots y_7$ is the ordinal indicating the candidate color.

Equation (1)

$$\begin{cases} x = \sum_{k=0}^{7} y_k \cdot (8-k)! \\ 0 \leq yi \leq (8-i) \\ yi \in Z \end{cases} \quad (1)$$

More specifically, the generator 121 determines $y_0, y_1, \ldots y_7$ according to equation (2) below.

Equation (2)

$$\begin{cases} yi = \left| \frac{x \bmod (8-i)!}{(8-i-1)!} \right| (i = 0, 1, 2, 3, 4, 5, 6) \\ y_7 = 0 \end{cases} \quad (2)$$

Using equation (2), the generator 121 selects the color assigned to the eight patches from $y_0, y_1, \ldots y_7$. The order of the eight colors corresponding to a specific integer x can therefore be determined, and the sequence of the colors of the patches in the identification patch group 210 can be determined with a 1:1 correction to integer x.

The colors white, cyan, magenta, yellow, blue, red, green, and black set for the patches of the identification patch group 210 are selected as colors with sufficient distance therebetween in the CMYK color space.

In this embodiment of the invention, the color of a white patch in the data for printing is set to cyan (C) 0%, magenta (M) 0%, yellow (Y) 0%, black (K) 0%.

The color of a cyan patch in the data for printing is set to cyan (C) 100%, magenta (M) 0%, yellow (Y) 0%, black (K) 0%.

The color of a magenta patch in the data for printing is set to cyan (C) 0%, magenta (M) 100%, yellow (Y) 0%, black (K) 0%.

The color of a yellow patch in the data for printing is set to cyan (C) 0%, magenta (M) 0%, yellow (Y) 100%, black (K) 0%.

The color of a blue patch in the data for printing is set to cyan (C) 100%, magenta (M) 100%, yellow (Y) 0%, black (K) 0%.

The color of a red patch in the data for printing is set to cyan (C) 0%, magenta (M) 100%, yellow (Y) 100%, black (K) 0%.

The color of a green patch in the data for printing is set to cyan (C) 100%, magenta (M) 0%, yellow (Y) 100%, black (K) 0%.

The color of a black patch in the data for printing is set to cyan (C) 100%, magenta (M) 100%, yellow (Y) 100%, black (K) 100%.

Except for white and black patches, the patches of the identification patch group 210 are thus set with one or two of the colors cyan (C), magenta (M), yellow (Y), and black (K) set to 100%. A black patch is set with the color components cyan (C), magenta (M), yellow (Y) and black (K) set to 100%, and a white patch is set with the color components cyan (C), magenta (M), yellow (Y) and black (K) all 0%. As a result, when the patches of the identification patch group 210 are printed by the printer 300, the colors at the outside limits of the color gamut of the printer 300, which is the range of colors that can be accurately reproduced by the printer 300, are printed.

The method whereby the extractor 125 identifies the color of a patch in the identification patch group 210, and identifies the page number, which is an example of information expressed by the arrangement of the patches, is described next.

The Lab values measured by the colorimeter 500 are input as the measured color values to the extractor 125. The extractor 125 then assigns a number indicating the order in which the Lab values were input. The extractor 125 then plots the input Lab values on the Lab color space.

Figure 3:
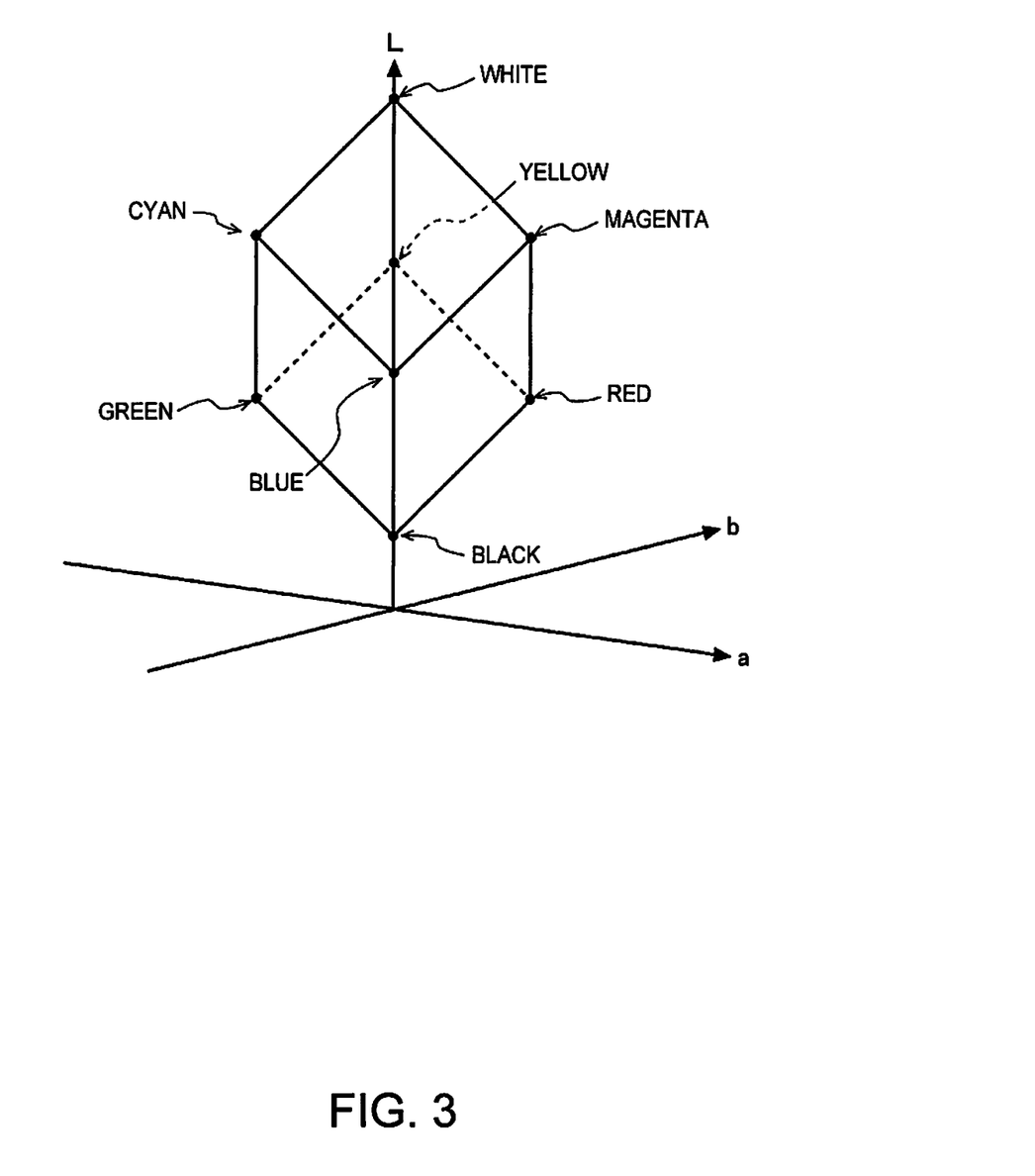
FIG. 3 shows an example of a Lab color space in which measured color values are plotted.
Figure 4:
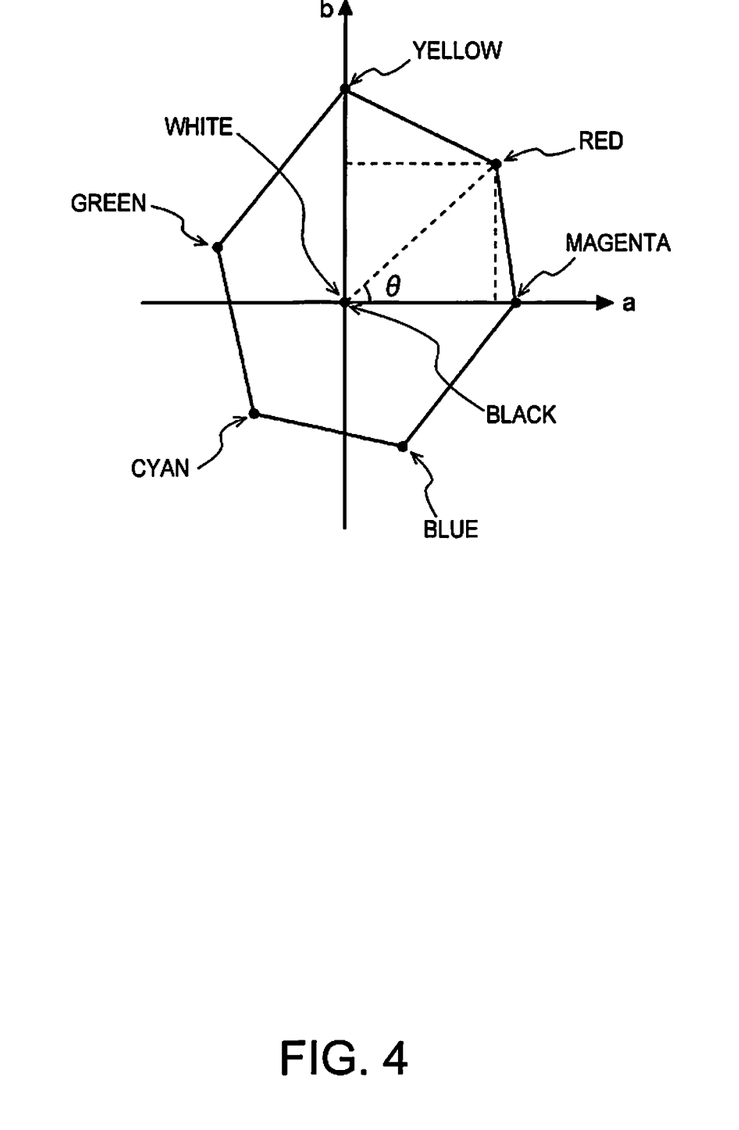
FIG. 4 illustrates the ab plane of a Lab color space in which measured color values are plotted.

FIG. 3 shows the Lab color space, and FIG. 4 illustrates a two-dimensional plane comprising the a* axis and b* axis of the Lab color space (referred to as the ab plane).

The extractor 125 plots the Lab values input from the colorimeter 500 on the Lab color space. Based on the arrangement of the plotted Lab values on the Lab color space, the extractor 125 then identifies the color of each Lab value. The extractor 125 first identifies the Lab value of black and white. The extractor 125 identifies the Lab value with the highest L* value as white, and identifies the Lab value with the lowest L* value as black.

For colors other than white and black, the extractor 125 correlates a Lab value to a color based on the angle on the ab plane.

For example, the extractor 125 obtains the vector on the ab plane from the origin to the coordinates on the ab plane of the a* value of the measured color value, and the vector on the ab plane from the origin to the coordinates on the ab plane of the b* value of the measured color value. The extractor 125 then calculates the angle θ formed by the diagonal (the angle from the a* axis in the example in FIG. 4) of a rectangle of which the two vectors are two sides as the angle on the ab plane. Based on the calculated angle θ, the extractor 125 correlates the measured color value to a color.

Once the extractor 125 determines the color of the Lab values of the measured patches of the identification patch group 210, the extractor 125 sorts the colors of the Lab values in numeric sequence according to the numbers indicating the input sequence assigned to each Lab value. The extractor 125 then acquires the page number corresponding to the sequence of the sorted colors by referencing the page information in the storage 110. The page information 115 is information relating the order of the eight colors white, cyan, magenta, yellow, blue, red, green, and black to a specific page number.

Once a page number is determined based on the measured color values of the patches of the identification patch group 210, the extractor 125 compares the identified page number with the counter value of a counter that counts the page numbers of the color chart 200. If the counter value and the identified page number do not match, the extractor 125 determines the color chart 200 is not being read in page sequence. If the counter value of the counter and the identified page number do not match, the extracted page information is different from the expected page information. In one example of a notification, the extractor 125 displays an error message on the display 104.

If the counter value of the counter and the identified page number match, the extractor 125 instructs the colorimeter 500 to measure the color of the patches in the profile production patch group 220 following measurement of the patches of the identification patch group 210.

Figure 5:
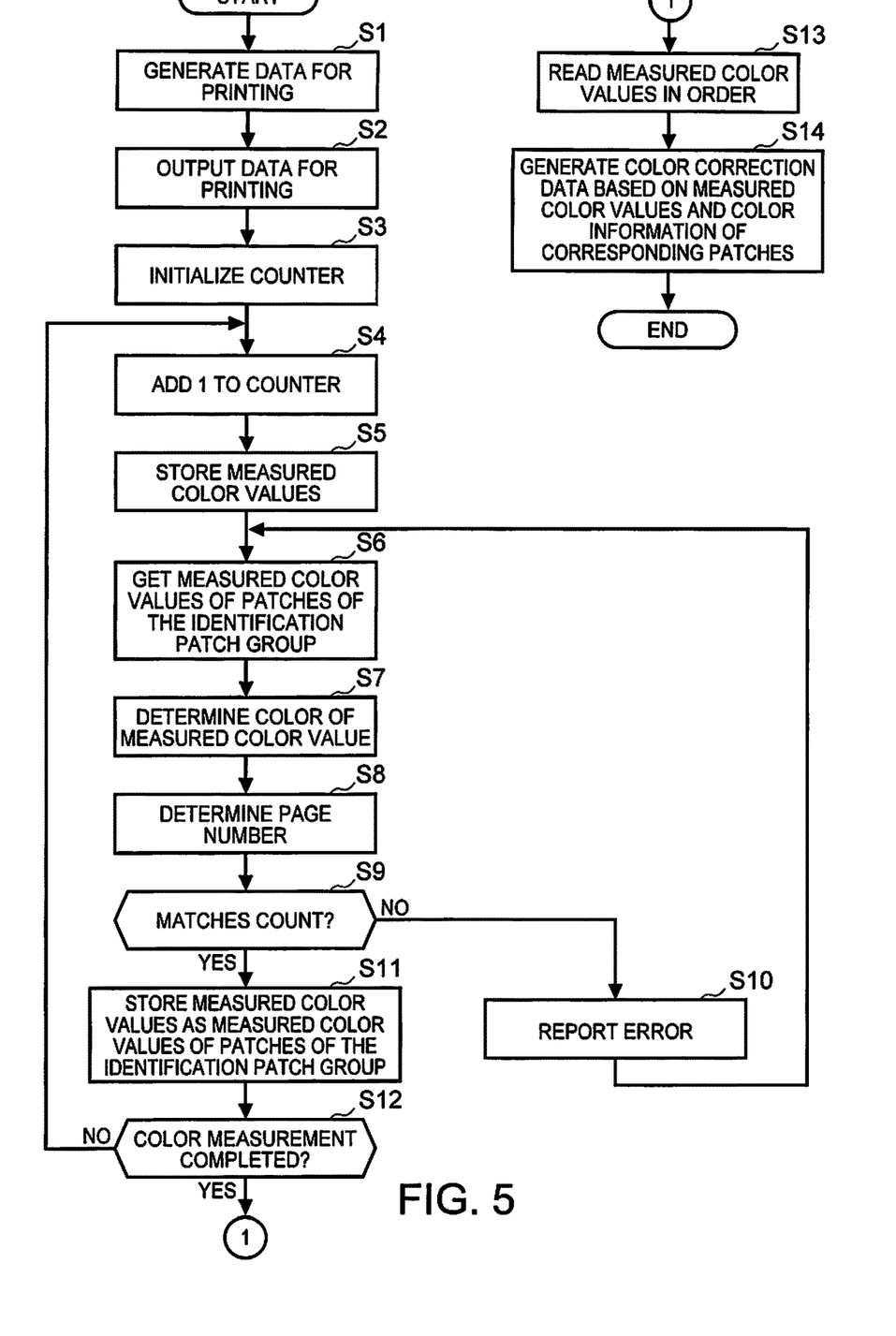
FIG. 5 is a flow chart illustrating an example of controller operation.

FIG. 5 is a flow chart of an operation of the controller 120.

The controller 120 first generates data for printing (step S1), and outputs the generated data for printing to the printer 300 (step S2). The printer 300 then prints images based on the data for printing input from the information processing device 100 on sheets S. As a result, a color chart of multiple pages is printed.

When a color chart is printed by the printer 300, the user sets the first page of the printed color chart in the colorimeter 500, and pushes a button to start color measurement on the operating panel (not shown in the figure) of the colorimeter 500. When the button to start color measurement is pushed, the colorimeter 500 outputs a notification signal reporting starting color measurement to the information processing device 100. When the notification signal reporting starting color measurement is input from the colorimeter 500, the controller 120 initializes the counter value of the counter that counts the page numbers of the sheets S (step S3), and then adds one to the value of the counter (step S4).

When the colorimeter 500 outputs the notification signal reporting starting color measurement to the information processing device 100, the colorimeter 500 starts color measurement of the first line of the first page of the color chart set in the colorimeter 500. The colorimeter 500 measures the colors of each patch formed on the first line of the color chart starting from the left end, and outputs the measured color values, which are the result of color measurement, to the information processing device 100. The controller 120 then acquires the measured color values of the first line of patches from the colorimeter 500, and stores the acquired measured color values of the first line of patches in storage 110 (step S55).

When color measurement of the first line ends, the colorimeter 500 pauses color measurement. When input of the measured color values from the colorimeter 500 stops, the controller 120 acquires the measured color values stored in storage 110. The controller 120 reads the first to eighth measured color values in the order input from the colorimeter 500 from the storage 110. More specifically, the controller 120 acquires the measured color values of the patches of the identification patch group 210 (step S6).

The controller 120 then plots the acquired first to eighth measured color values in the Lab color space and determines the color of the eight measured color values (step S7). When the colors of the eight measured color values are determined, the controller 120 arranges the identified colors of the measured color values in the order in which the measured color values were input, and determines the order of the colors. The input sequence of the measured color values is the order in which the values are input from the colorimeter 500. Next, the controller 120 references the page information 115 in the storage 110 based on the identified order of colors, and acquires the page number corresponding to the identified order of colors, and determines the page number (step S8).

Next, the controller 120 compares the identified page number with the counter value of the counter, and determines whether or not the identified page number and the counter value of the counter match (step S9). If the identified page number and the counter value of the counter do not match (step S9: NO), the controller 120 controls the display 104 to display an error message (step S10), and deletes the measured color values of the first line of patches stored in storage 110. If the identified page number and the counter value of the counter match (step S9: YES), the controller 120 instructs the colorimeter 500 to measure the colors of the remaining patches from line two to the end of the sheet S.

The controller 120 considers the measured color values from the ninth to the last patch in the measured color values of the patches on the first line stored in the storage 110 to be measured color values of patches in the profile production patch group 220. The controller 120 stores the measured color values of the patches from the second and following lines input from the colorimeter 500 in the storage 110 as the measured color values of the patches in the profile production patch group 220 following the ninth to the last patches on the first line (step S11).

Next, the controller 120 determines if color measurement was completed (step S12). When color measurement of all pages of the color chart is completed, the user pushes a stop button disposed to the operating panel of the colorimeter 500. If a page of the color chart has not been measured, the user sets the next page of the color chart in the colorimeter 500, and pushes the color measurement button on the operating panel. When the stop button is pushed, the colorimeter 500 outputs an operating signal indicating color measurement was completed to the information processing device 100. If the color measurement button is pushed, the colorimeter 500 outputs an operating signal reporting color measurement of the next page to the information processing device 100.

If an operating signal reporting color measurement of the next page is input, the controller 120 determines color measurement has not ended (step S12: NO), and adds one to the counter value of the counter (step S4). The controller 120 then continues processing from step S5. More specifically, the controller 120 acquires and stores in storage 110 the measured color values of the first line of patches input from the colorimeter 500, and determines the page number from the measured color values of the first to eighth input patches (step S8). Next, the controller 120 determines if the identified page number of the color chart and the counter value of the counter match (step S9), and if they do not match (step S9: NO), displays an error on the display 104 (step S10). If the values match (step S9: YES), the controller 120 instructs the colorimeter 500 to continue color measurement of the patches from the second line of the sheet S.

If an operating signal indicating color measurement ended is input (step S12: YES), the controller 120 determines that color measurement of all pages of the color chart was completed. When color measurement of all pages of the color chart is completed, the controller 120 reads the measured color values of the patches in the profile production patch group 220 in the order input (step S13). In addition, the controller 120 reads pattern data 113 from the storage 110. The controller 120 compares the color information used to generate the patches with the measured color values of the patch colors measured by the colorimeter 500 and generates color correction data (step S14), and stores the generated color correction data in storage 110. The controller 120 generates color correction data for all patches of the profile production patch group 200 for which measured color values were acquired.

When image data for the printer 300 to print is input, the controller 120 references the color correction data when converting the image data to CMYK data in the color conversion process of the driver 123.

Figure 6:
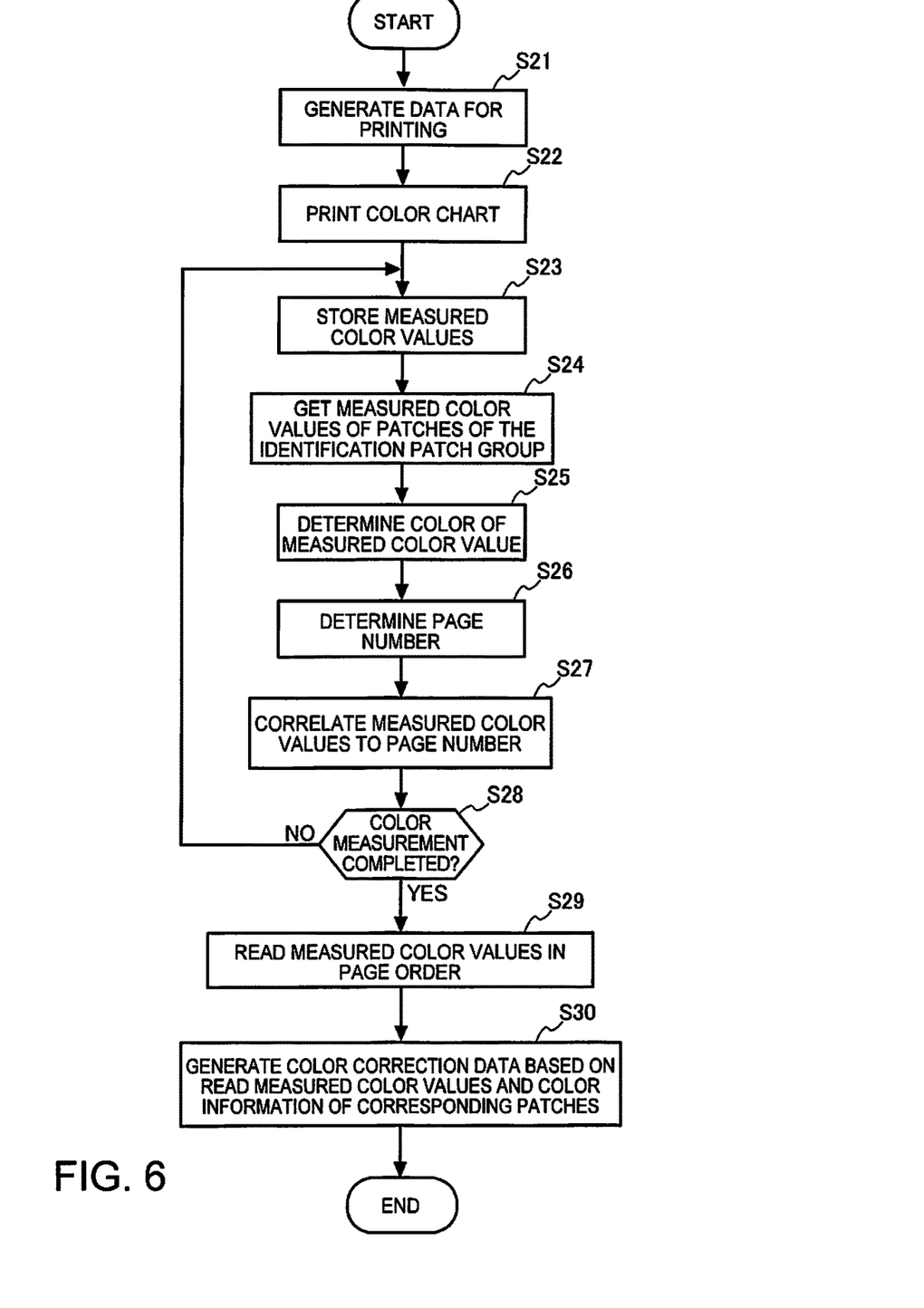
FIG. 6 is a flow chart illustrating another example of controller operation.

FIG. 6 is a flow chart of a variation of controller 120 operation.

In the flow chart shown in FIG. 5, a page number expressed by the arrangement of patches of the identification patch group 210 is determined, and if the pages of the color chart are not being read in page sequence, an error is displayed. The flow chart in FIG. 6 describes operation of the controller 120 when reading the pages of the color chart in random order. Note that the operations described in steps S21 and S22 in FIG. 6 are the same as in the flow chart in FIG. 5, and further description thereof is omitted.

The controller 120 stores the measured color values input from the colorimeter 500 in storage 110 in the order the measured color values were input (step S23). When the measured color values of the patches printed on one page of the color chart 200 are input from the colorimeter 500, the controller 120 acquires the first to eighth measured color values in the order input as the measured color values of the patches of the identification patch group 210 (step S24).

Next, the controller 120 plots the acquired first to eighth measured color values in the Lab color space and determines the color of the eight measured color values (step S25). When the colors of the eight measured color values are determined, the controller 120 arranges the identified colors of the measured color values in the order in which the measured color values were input, and determines the order of the colors. The input sequence of the measured color values is the order in which the values are input from the colorimeter 500. Next, the controller 120 references the page information 115 in the storage 110 based on the identified order of colors, and acquires the page number corresponding to the identified order of colors, and determines the page number (step S26).

Once the page number is determined, the controller 120 relates the measured color values in the order input from the ninth patch to the identified page number (step S27). More specifically, the controller 120 stores the measured color values in the input order from the ninth patch as the measured color values measured for the patches of the color chart 200 page indicated by the page number.

Next, the controller 120 determines if color measurement was completed (step S28). If an operating signal reporting color measurement of the next page is input from the colorimeter 500, the controller 120 determines color measurement has not ended (step S28: NO), and returns to step S23. The controller 120 stores the measured color values input from the colorimeter 500 to the storage 110 (step S23).

If an operating signal indicating color measurement ended is input from the colorimeter 500, the controller 120 determines that color measurement was completed. In this event, the controller 120 reads the measured color values stored relationally to a page number from the storage 110 in the page sequence (step S29). If the measured color values are for patches on the same page, the controller 120 reads the measured color values in the order input from the colorimeter 500.

The controller 120 then reads pattern data 113 from the storage 110. The controller 120 compares the color information used to generate the patches with the measured color values of the patch colors measured by the colorimeter 500 and generates color correction data (step S30), and stores the generated color correction data in storage 110. The controller 120 generates color correction data for all patches of the profile production patch group 200 for which measured color values were acquired.

As described above, a information processing device 100 according to the first embodiment of the invention has a generator 121, a communication interface 101 that operates as a receiver, extractor 125, and an adjuster 127.

The generator 121 generates image data that is data for printing a color chart 200. A color chart is a color chart 200 having an array of multiple color patches. The multiple patches of the color chart 200 include a group of identification patches expressing page information, which indicates at least one of the page number or the order of pages of the color chart 200, by the arrangement (order) of the patches.

The communication interface 101 receives results of measuring the color values of a color chart 200 printed based on data for printing, which is image data converted to a format the printer 300 can interpret.

The extractor 125 extracts from the color measurement results received by the communication interface 101, page information expressed by the arrangement of the identification patches in the color chart 200.

The adjuster 127 generates color correction data based on the color measurement results the communication interface 101 receives.

Page information of the color chart 200 can therefore be extracted from the color measurement results of a color chart 200 for generating color correction data. As a result, mistaking the page of the color chart 200 that is measured can be effectively prevented while measuring the color patches in the color chart 200.

The generator 121 generates image data for printing a color chart 200 having patches of an identification patch group on the first line of a color chart 200 having patches arranged in a line and column grid.

Therefore, before generating color correction data based on the results of measuring the color of multiple patches, page information for the color chart 200 can be acquired. As a result, when the page being measured is wrong, processing can be stopped before generating color correction data.

The generator 121 includes in the identification patch group one or more patches of the colors white, cyan, magenta, yellow, blue, red, green, black.

The patches in the identification patch group 210 can therefore be easily identified in a color chart 200 comprising multiple patches based on the color measurement results.

The generator 121 determines the order of the patches in the identification patch group 210 so that patches of the same color are not adjacent to each other on the same line.

This simplifies identifying the identification patches based on the color measurement results.

A display 104 also displays an error message when the page information extracted by the extractor 125 is different from the expected page information.

An error message can therefore be displayed when the extracted page information differs from the expected page information.

The generator 121 generates image data for a color chart 200 comprising multiple pages. Included in the identification patch group 210 of each page are multiple patches expressing at least one of the page number or the order of pages in the color chart 200.

Each page of a color chart 200 comprising multiple pages can therefore be identified from the color measurement results of the patches in the identification patch group 210.

Based on page information extracted by the extractor 125, the adjuster 127 identifies the page of the color chart 200 corresponding to the color measurement results the communication interface 101 received.

Page information expressed by the order of patches in the identification patch group 210 can therefore be extracted and the page of the color chart 200 identified.

The adjuster 127 sorts the color measurement results the communication interface 101 received, and generates color correction data, according to the order of the pages of the identified color chart 200.

The color measurement results can therefore be sorted according to the order of the pages of the identified color chart 200. As a result, even if the color measurement results are not input to the information processing device 100 in the order of the pages of the color chart 200, the color measurement results of multiple patches can be sorted in the order of the pages in the color chart 200.

The communication interface 101 receives the color measurement results of the color chart 200 a printer 300 printed based on data for printing. The adjuster 127 generates color correction data appropriate to the printer 300 based on the color measurement results the communication interface 101 receives.

Color correction data appropriate to the printer 300 that printed the color chart 200 can therefore be generated.

The color chart 200 is a color chart 200 that is printed by a printer 300. The color chart 200 comprises multiple matches of different colors arranged in a line and column grid.

Patches of an identification patch group 210 expressing page information, which indicates at least one of the page number or the order of pages of the color chart 200, are disposed on the first line of the color chart 200.

The patches in the identification patch group 210 include one or more patches of the colors white, cyan, magenta, yellow, blue, red, green, black.

Therefore, by measuring the color of the color chart 200, color correction data can be generated and color chart 200 page information can be extracted.

Embodiment 2

The embodiment described above plots the measured color values of the patches of the identification patch group 210 in a Lab color space, and determines the color of each measured color value based on the L* value and the angle θ on the ab plane.

This second embodiment of the invention compares the Lab values input from the colorimeter 500 with threshold values to determine the color of the measured color values of the patches in the identification patch group 210.

First, the controller 120 converts the Lab values input from the colorimeter 500 to LCH values using equation (3) shown below.

Equation (3)

$$\begin{cases} C = \sqrt{a^2 + b^2} \\ H = \tan^{-1}\dfrac{b}{a} \end{cases} \qquad (3)$$

After converting Lab values to LCH values, the controller 120 compares the converted LCH values with threshold values to determine the color of the measured color value. The method of determining the color of a measured color value by comparison with a threshold value is described below.

Below, Li, Ci, Hi are measured color values evaluated to determine the color. Also below, C', $L_W$, $L_B$, $H_{CY0}$, $H_{CY1}$, $H_{MG0}$, $H_{MG1}$, $H_{YL0}$, $H_{YL1}$, $H_{BL0}$, $H_{BL1}$, $H_{RD0}$, $H_{RD1}$, $H_{GR0}$, $H_{GR1}$ are all threshold values.

The controller 120 determines the color of a measured color value satisfying the relationship Li≥$L_W$, Ci<C' is white.

The controller 120 determines the color of a measured color value satisfying the relationship Ci≥C', $H_{CY0}$≤Hi<$H_{CY1}$ is cyan.

The controller 120 determines the color of a measured color value satisfying the relationship Ci≥C', $H_{MG0}$≤Hi<360°, 0≤Hi<$H_{MG1}$ is magenta.

The controller 120 determines the color of a measured color value satisfying the relationship Ci≥C', $H_{YL0}$≤Hi<$H_{YL1}$ is yellow.

The controller 120 determines the color of a measured color value satisfying the relationship Ci≥C', $H_{BL0}$≤Hi<$H_{BL1}$ is blue.

The controller 120 determines the color of a measured color value satisfying the relationship Ci≥C', $H_{RD0}$≤Hi<$H_{RD1}$ is red.

The controller 120 determines the color of a measured color value satisfying the relationship Ci≥C', $H_{GR0}$≤Hi<$H_{GR1}$ is green.

The controller 120 determines the color of a measured color value satisfying the relationship Li<La, Ci<C' is black.

When the sheet S is sufficiently white and the density of the ink of the printer 300 is sufficiently dense, colors can be determined with accuracy sufficient for practical use if the threshold values are set based on a standard color profile. An example of evaluation when the threshold values are set based on Japan Color®, a standard color profile, is described below. An example of threshold values set based on Japan Color is described below.

In the Japan Color 2001 Coated profile, the L* value of white is 100, and the c* value is 0.0. The controller 120 sets threshold value $L_W$ to 50, and the threshold value C' to 35, and determines the color of a measured color value satisfying the relationship Li≥50, Ci<35 is white.

In the Japan Color 2001 Coated profile, the L* value of cyan is 58, the c* value is 65.4, and the h* value is 231.20.

The controller 120 sets the threshold values $H_{CY0}$=195.9° and $H_{CY1}$=264.1°, and determines the color of a measured color value satisfying the relationship Ci≥35, 195.9°≤Hi<264.1° to be cyan.

In the Japan Color 2001 Coated profile, the L* value of magenta is 49, c* is 82.1, and h* is 357.20.

The controller 120 sets the threshold values $H_{MG0}=327.1°$ and $H_{MG1}=17.7°$, and determines the color of a measured color value satisfying the relationship $Ci \geq 35$, $327.1° \leq Hi < 360°$, $0° \leq Hi < 17.7°$ is magenta.

In the Japan Color 2001 Coated profile, the L* of yellow is 94, c* is 105.3, and h* is 94.4°.

The controller 120 sets the threshold values $H_{YL0}=66.30$ and $H_{YL1}=127.40$, and determines the color of a measured color value satisfying the relationship $Ci \geq 35$, $66.3° \leq Hi < 127.40$ is yellow.

In the Japan Color 2001 Coated profile, the L* of blue is 19, c* is 66.2, and h* is 297.00.

The controller 120 sets the threshold values $H_{BL0}=264.10$ and $H_{BL1}=327.1°$, and determines the color of a measured color value satisfying the relationship $Ci \geq 35$, $264.1° \leq Hi < 327.1°$ is blue.

In the Japan Color 2001 Coated profile, the L* of red is 49, c* is 95.4, and h* is 38.20°.

The controller 120 sets the threshold values $H_{RD0}=17.7°$ and しきい値 $H_{RD1}=66.3$, and determines the color of a measured color value satisfying the relationship $Ci \geq 35$, $17.7° \leq Hi < 66.3°$ is red.

In the Japan Color 2001 Coated profile, the L* of green is 52, c* is 87.0, and h* is 160.5°.

The controller 120 sets the threshold values $H_{GR0}=127.40$ and しきい値 $H_{GR1}=195.9°$, and determines the color of a measured color value satisfying the relationship $Ci \geq 35$, $127.4° \leq Hi < 195.9°$ is green.

In the Japan Color 2001 Coated profile, the L* of black [sic, グリーン] is 10, c* is 6.4, and h* is 38.7°.

The controller 120 sets the threshold values $L_B=50$ and $C'=35$, and determines the color of a measured color value satisfying the relationship $Ci < 35$, $Li < 50$ is black.

Embodiment 3

If the color of the sheet S is not white, or the color of the ink of the printer 300 is light, the color values measured by the colorimeter 500 will change. As a result, this third embodiment corrects the threshold values based on the color measurement results, and determines the color of the measured color value using the corrected threshold values.

Figure 7:
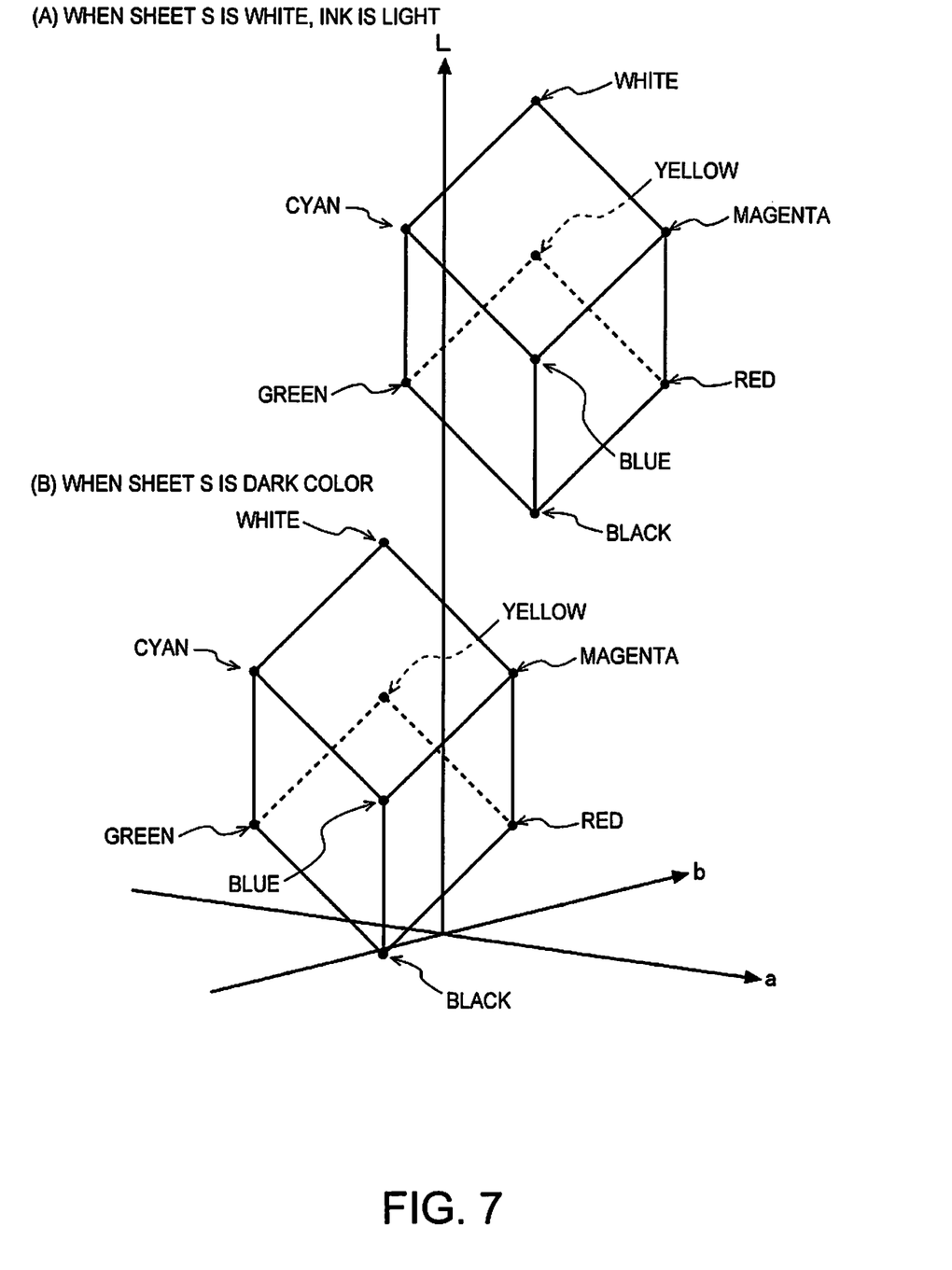
FIG. 7 illustrates change in the measured color values of the Lab color space resulting from change in the color of the sheet.

FIG. 7 shows a Lab color space in which the measured color values are plotted.

In FIG. 7, (A) shows the measured color values of a color chart 200 printed on a white sheet S by a printer 300 using pale colors of ink, and (B) shows the measured color values of a color chart 200 printed on a dark colored sheet S.

When the colors of a color chart 200 printed by a printer 300 using pale colors of ink are measured, L* is high overall. When the colors of a color chart 200 printed on a dark colored sheet S are measured, L* is low overall.

This embodiment of the invention corrects the threshold values based on the spread of the measured color values in the LCH color space. More specifically, the values of threshold values C', $L_W$ and $L_B$ are corrected using the maximum L* of the measured color values as $L_{max}$, the minimum L* as $L_{min}$, and the maximum c* as $C_{max}$. The correction equations for correcting threshold values C', $L_W$ and $L_B$ are shown below.

$$C'=35 \times C_{max}/105.3$$

$$L_W=L_B=50 \times (L_{max}-L_{min})/2$$

The accuracy of color evaluation can be improved by correcting threshold values C', $L_W$ and $L_B$ using these equations and evaluating the colors of the measured color values using the corrected threshold values.

The embodiment described above is a preferred embodiment of the invention. However, the invention is not limited to this embodiment, and embodiments that differ in many ways without departing from the scope of the accompanying claims are conceivable.

For example, the embodiments described above describe using eight patches as the patches of the identification patch group 210, but the number of patches in the identification patch group 210 is not limited to eight. The colors of the patches of the identification patch group 210 are also not limited to the eight colors white, cyan, magenta, yellow, blue, red, green, and black, and any colors that can be identified based on the measured color values may be used.

In the embodiments described above, the page information indicates at least one of the page number or the order of pages of the color chart 200 by the order of the patches (colors), but the information represented by the order of the patches is not limited to page information. For example, the type of sheet S on which the color chart 200 is printed, printer 300 settings, or other information may be expressed by the order of the patches.

The function blocks of the information processing device 100 shown in FIG. 1 describe a functional configuration, and the specific embodiment thereof is not specifically limited. More specifically, hardware components corresponding individually to each function unit are not necessarily required, and configurations in which a single processor embodies the functions of multiple function units by executing a specific program or programs are obviously conceivable. Furthermore, some functions embodied by software in the foregoing embodiments may be embodied by hardware, and some functions embodied by hardware in the foregoing embodiments may be embodied by software. The specific detailed configuration of other parts of the information processing device 100 can also be modified as desired without departing from the scope of the accompanying claims.

The processing units of the flow charts shown in FIG. 5 and FIG. 6 are divided according to the main content of the processes in order to facilitate understanding the processes of the controller 120. The invention is not limited by the method of segmenting or naming the processing units shown in the flow chart of FIG. 5 and FIG. 6. The processes of the controller 120 can be further divided, according to the process content, into more processing units, and single processing units may be further divided into more processing units. In addition, the sequence of the steps shown in the foregoing flow charts is not limited to the order shown in the figures.

The program executed by the information processing device 100 in the embodiments described above is described as being stored in storage 110, but the program does not need to be stored on storage 110. For example, the program may be stored on any computer-readable storage medium, including removable media such as a floppy disk, DVD, DVD-RAM, CD-ROM, CD-R/RW, magneto-optical disc, or IC card. The program may also be stored on a server connected to the information processing device 100 through a public telecommunication system, the Internet, LAN, or WAN, and the information processing device 100 may download the program from the server. The program may also be stored from a server through a public telecommunication system, the Internet, LAN, or WAN to a removable or fixed storage medium, and the information processing device 100 may read and run the program from the removable or fixed storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. An information processing device comprising:
a processor constituting a generator configured to generate data for printing used to print a color chart of multiple pages each including a plurality of identification patches and a plurality of profile production patches, the identification patches respectively having a plurality of colors while the identification patches of the same color are not adjacent to each other on the same line and a sequence of the identification patches represents page information; and
a communication interface circuit configured to receive color measurement results of the identification patches and the profile production patches in each of the pages of the color chart printed based on the data for printing, wherein
the processor further constituting
an extractor configured to extract the page information represented by the sequence of the identification patches in each of the pages of the color chart from the color measurement results of the identification patches received by the communication interface circuit, and
an adjustor configured to generate color correction data based on the color measurement results of the profile production patches.

2. The information processing device described in claim 1, wherein
the generator generates the data for printing used to print the color chart with the identification patches on a first line in a color chart having the patches arrayed in a row and column grid.

3. The information processing device described in claim 2, wherein
the generator disposes in the identification patches one of each of the colors white, cyan, magenta, yellow, blue, red, green, and black.

4. The information processing device described in claim 2, wherein
the processor further constitutes a notifier configured to report when the page information extracted by the extractor differs from page information of a specific sequence.

5. The information processing device described in claim 1, wherein
the generator generates the data for printing for a color chart having multiple pages, the identification patches of each page including multiple identification patches representing at least one of a page number or a sequence of pages in the color chart.

6. The information processing device described in claim 5, wherein
the adjustor, based on the page information extracted by the extractor, identifies a page of the color chart corresponding to the color measurement results received by the communication interface.

7. The information processing device described in claim 6, wherein
the adjustor sorts the color measurement results received by the communication interface according to a sequence of pages of the identified color chart, and generates the color correction data.

8. The information processing device described in claim 1, wherein
the communication interface receives the color measurement results of the color chart a printer printed based on the data for printing; and
the adjustor generates color correction data appropriate to the printer based on the color measurement results the communication interface receives.

9. A color chart that is subjected to color measurement by the information processing device according to claim 1, the color chart comprising:
the identification patches and the profile production patches printed by a printer on a medium and arrayed in a row and column grid, the sequence of the identification patches representing the page information configured to be read by the information processing device.

10. An information processing method comprising:
generating data for printing used to print a color chart of multiple pages each including a plurality of identification patches and a plurality of profile production patches, the identification patches respectively having a plurality of colors while the identification patches of the same color are not adjacent to each other on the same line and a sequence of the identification patches represents page information;
measuring the color chart printed based on the data for printing, and storing color measurement results of the identification patches and the profile production patches in each of the pages acquired by color measurement;
extracting, from the color measurement results of the identification patches, page information represented by the sequence of the identification patches in each of the pages of the color chart; and
generating color correction data based on the color measurement results of the profile production patches.

11. A machine-readable color chart and comprising:
a plurality of identification patches and a plurality of profile production patches printed by a printer on a medium and arrayed in a row and column grid, a sequence of the identification patches representing page information configured to be read by an information processing device;
the identification patches being the sequence of patches of multiple different colors while the identification patches of the same color are not adjacent to each other on the same line.

12. The color chart described in claim 11, wherein
the identification patches include one or more patches of each of the colors white, cyan, magenta, yellow, blue, red, green, and black.

* * * * *